US010382135B2

(12) United States Patent
Takeshita et al.

(10) Patent No.: US 10,382,135 B2
(45) Date of Patent: Aug. 13, 2019

(54) OPTICAL NODE DEVICE, OPTICAL NETWORK CONTROLLER, AND OPTICAL NETWORK CONTROL METHOD

(71) Applicant: NEC Corporation, Minato-ku, Tokyo (JP)

(72) Inventors: Hitoshi Takeshita, Tokyo (JP); Shinsuke Fujisawa, Tokyo (JP); Tomoyuki Hino, Tokyo (JP); Akio Tajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 172 days.

(21) Appl. No.: 15/305,753

(22) PCT Filed: Apr. 15, 2015

(86) PCT No.: PCT/JP2015/002075
§ 371 (c)(1),
(2) Date: Oct. 21, 2016

(87) PCT Pub. No.: WO2015/162875
PCT Pub. Date: Oct. 29, 2015

(65) Prior Publication Data
US 2017/0054506 A1 Feb. 23, 2017

(30) Foreign Application Priority Data
Apr. 24, 2014 (JP) ................. 2014-089696

(51) Int. Cl.
*H04B 10/27* (2013.01)
*H04J 14/00* (2006.01)
(Continued)
(52) U.S. Cl.
CPC .............. *H04B 10/27* (2013.01); *H04J 14/00* (2013.01); *H04J 14/02* (2013.01); *H04L 12/28* (2013.01); *H04L 12/6418* (2013.01)

(58) Field of Classification Search
CPC .......... H04B 10/27; H04J 14/00; H04J 14/02; H04L 12/28; H04L 12/6418
(Continued)

(56) References Cited

U.S. PATENT DOCUMENTS 6,366,377 B1 * 4/2002 Tajima ................ H04J 14/0221
398/82
8,818,191 B2 8/2014 Sakamoto et al.
(Continued)

FOREIGN PATENT DOCUMENTS

JP 2012-029156 A 2/2012
JP 2012029156 A * 2/2012
(Continued)

OTHER PUBLICATIONS

Jinno et al; Spectrum-efficient and scalable Elastic optical path Netwok Architecture, Benefits and Enabling technologies; IEEE; Nov. 2009; pp. 66-73.*
(Continued)

*Primary Examiner* — Amritbir K Sandhu

(57) ABSTRACT

In an optical network based on a dense wavelength division multiplexing system using a flexible frequency grid, it is difficult to improve the usage efficiency of an optical frequency band owing to the occurrence of fragmentation of the optical frequency band; therefore, an optical network controller according to an exemplary aspect of the present invention includes an optical frequency region setting means for setting a plurality of optical frequency regions in an optical frequency band used in an optical network based on a dense wavelength division multiplexing system using a flexible frequency grid; an optical path setting means for setting optical paths having a common attribute in at least one of the plurality of optical frequency regions; and an optical frequency region control means for changing an optical frequency width of the optical frequency region, and
(Continued)

instructing the optical frequency region setting means to reconfigure, as the plurality of optical frequency regions, a plurality of optical frequency reconfigured regions each of which having the optical frequency width after having been changed.

17 Claims, 9 Drawing Sheets

(51) Int. Cl.
    *H04J 14/02* (2006.01)
    *H04L 12/28* (2006.01)
    *H04L 12/64* (2006.01)
(58) Field of Classification Search
    USPC .............................................. 398/43, 58–64
    See application file for complete search history.

(56) References Cited

U.S. PATENT DOCUMENTS

| | | | |
|---|---|---|---|
| 9,083,485 B2 | 7/2015 | Wang et al. | |
| 9,240,856 B2* | 1/2016 | Mizutani | H04J 14/0257 |
| 9,831,976 B2* | 11/2017 | Kamura | H04J 14/0227 |
| 9,882,647 B2* | 1/2018 | Endo | H04B 10/50 |
| 9,979,468 B2* | 5/2018 | Fujisawa | H04B 10/032 |
| 2009/0317076 A1* | 12/2009 | Shimizu | G01J 3/02 |
| | | | 398/25 |
| 2011/0164620 A1* | 7/2011 | Jinno | H04J 14/0204 |
| | | | 370/392 |
| 2012/0195602 A1* | 8/2012 | Nakashima | H04L 7/0337 |
| | | | 398/204 |
| 2012/0224851 A1* | 9/2012 | Takara | H04B 10/0793 |
| | | | 398/45 |
| 2012/0301141 A1 | 11/2012 | Sakamoto et al. | |
| 2013/0195460 A1* | 8/2013 | Kadohata | H04J 14/0257 |
| | | | 398/79 |
| 2013/0251365 A1* | 9/2013 | Sone | H04B 10/07955 |
| | | | 398/38 |
| 2013/0272710 A1 | 10/2013 | Wang et al. | |
| 2014/0294384 A1* | 10/2014 | Wakabayashi | H04J 14/0257 |
| | | | 398/49 |
| 2014/0314416 A1* | 10/2014 | Vassilieva | H04B 3/32 |
| | | | 398/76 |
| 2016/0204875 A1* | 7/2016 | Araki | H04B 10/572 |
| | | | 398/34 |
| 2016/0212511 A1* | 7/2016 | Takeshita | H04J 14/02 |
| 2016/0352452 A1* | 12/2016 | Takeshita | H04J 14/0263 |
| 2017/0054506 A1* | 2/2017 | Takeshita | H04B 10/27 |
| 2017/0180073 A1* | 6/2017 | Takeshita | H04B 10/27 |
| 2017/0302370 A1* | 10/2017 | Fujisawa | H04B 10/032 |
| 2017/0338890 A1* | 11/2017 | Takeshita | H04B 10/27 |
| 2017/0353244 A1* | 12/2017 | Takeshita | H04L 12/437 |

FOREIGN PATENT DOCUMENTS

| | | |
|---|---|---|
| JP | 2012-248958 A | 12/2012 |
| JP | 2013-223245 A | 10/2013 |
| JP | 2014-017651 A | 1/2014 |

OTHER PUBLICATIONS

"Spectrum-Efficient and Scalable Elastic Optical Path Network: Architecture, Benefits, and Enabling Technologies", Masahiko Jinno et al., IEEE Communications Magazine, Nov. 2009, vol. 47, No. 11, pp. 66-73.

International Search Report for PCT Application No. PCT/JP2015/002075, dated Jun. 2, 2015.

English translation of Written opinion for PCT Application No. PCT/JP2015/002075. dated Oct. 25, 2016.

* cited by examiner

FIG. 7

|  | SLOT WIDTH | INITIALLY ALLOCATED NUMBER | MAXIMUM NUMBER OF ADDABLE ALLOCATION |
|---|---|---|---|
| BAND 1 | 1 | 8 | 4 |
| BAND 2 | 2 | 5 | 2 |
| BAND 3 | 4 | 2 | 1 |

FIG. 9

|  | SLOT WIDTH | INITIALLY ALLOCATED NUMBER | MAXIMUM NUMBER OF ADDABLE ALLOCATION |
|---|---|---|---|
| BAND 1 | 1 | 8 | 6 |
| BAND 2 | 2 | 5 | 4 |
| BAND 3 | 4 | 2 | 0 |

OPTICAL NODE DEVICE, OPTICAL NETWORK CONTROLLER, AND OPTICAL NETWORK CONTROL METHOD

This application is a National Stage Entry of PCT/JP2015/002075 filed on Apr. 15, 2015, which claims priority from Japanese Patent Application 2014-089696 filed on Apr. 24, 2014, the contents of all of which are incorporated herein by reference, in their entirety.

TECHNICAL FIELD

The present invention relates to optical node devices, optical network controllers, and optical network control methods, in particular, to an optical node device, an optical network controller, and an optical network control method that are used in an optical network based on a dense wavelength division multiplexing system using a flexible frequency grid.

BACKGROUND ART

A current challenge for optical communications is to expand the capacities of optical backbone network to cope with the possible future explosive expansion of information communications traffic. Various approaches are being taken to the challenge. One of the approaches is to carry out research and development regarding an improvement in usage efficiency of an optical frequency band.

In optical networks, optical frequency bands are used in accordance with the Dense Wavelength Division Multiplexing (DWDM) system standardized by the Telecommunication Standardization sector of the International Telecommunication Union (ITU-T). In the DWDM system, the entire available optical frequency band is divided into narrow segments by a grid with constant width, called a wavelength grid, and optical signals in one wavelength channel are allocated within a grid spacing (ITU-T recommendation G.694.1).

In a flexible frequency grid that is standardized by ITU-T recommendation G.694.1, the minimum channel spacing is set at 12.5 GHz instead of 50 GHz used conventionally, and a frequency slot width is variable by 12.5 GHz. This makes it possible to allocate a frequency slot of different widths to each optical path; accordingly, it becomes possible to minimize an optical bandwidth to be allocated to an optical path.

That is to say, the flexible frequency grid enables to allocate an optical bandwidth only as needed. Specifically, for example, it is only necessary in the flexible frequency grid to allocate an optical bandwidth of 12.5 GHz if the required optical bandwidth is equal to 12.5 GHz and to allocate an optical bandwidth of 50 GHz if it is equal to 50 GHz. In contrast, in a fixed grid before the introduction of the flexible frequency grid, if the frequency slot width is set at 50 GHz, an optical bandwidth of 50 GHz is allocated equally to each optical path regardless of a required optical bandwidth. Even though a required optical bandwidth is 12.5 GHz, for example, the optical bandwidth to be allocated is 50 GHz; accordingly, a bandwidth by 37.5 GHz is allocated in vain. In contrast, the flexible frequency grid makes it possible to reduce such unnecessary allocation of the bandwidth, so it enables the optical frequency band usage efficiency to improve.

However, even though the flexible frequency grid is used, an unused frequency region can arise, and a fragmentation of the optical bandwidth allocation may arise. It is considered that an optical path with four slots in width is intended to be generated and there are ten empty slots as a whole in the optical frequency band of an optical fiber, for example. If the ten empty slots are composed of five pairs of empty slots each of which includes two consecutive slots, it is impossible to generate an optical path with four slots in width. That is to say, despite the fact that there are sufficient empty slots in total, it is impossible to secure consecutive empty slots because the respective empty slots are disposed in fragments. As a result, the situation may occur where it is impossible to allocate to an optical path a wide optical bandwidth with which high-capacity or long-distance communications can be achieved. This is called a fragmentation of an optical frequency, which is made easier to arise as the center optical frequency of the optical path or the number of slots of the optical bandwidth is changed more repeatedly.

Patent Literature 1 discloses a technology to solve the above-mentioned problem that the fragmentation of the optical frequency arises.

In a method for eliminating the fragmentation of an optical spectrum in an optical network described in Patent Literature 1, first, optical signals are allocated to a plurality of frequency slots. This allocation is performed based on a first-fit algorithm of searching first unoccupied consecutive frequency slots closest to a selected frequency slot. In this case, a frequency slot dependency map is created based on the allocation of a plurality of optical signals to a plurality of frequency slots. The frequency slot dependency map relates groups including one or more frequency slots allocated to different optical signals interdependently.

If an optical signal departure event that an optical signal is dropped from an optical network occurs, a frequency slot occupied by the optical signal is released as a result. The optical signal departure event and the release of frequency slots cause fragmentation of the optical spectrum of the optical network.

In the method for eliminating fragmentation of optical spectrum described in Patent Literature 1, the fragmentation of the optical spectrum is eliminated by reallocating optical signals to different frequency slots based on the frequency slot dependency map. That is to say, by using the frequency slot dependency map after an optical signal departure event, frequency slots of one or more optical signals depending on a frequency slot of a dropped optical signal are determined. Based on that information, an optical signal is reallocated to a frequency slot released by the departure of the dropped optical signal (defragmentation).

CITATION LIST

Patent Literature

[PTL 1] Japanese Patent Application Laid-open Publication No. 2013-223245 (paragraphs [0021] to [0048])

SUMMARY OF INVENTION

Technical Problem

In the above-mentioned method for eliminating fragmentation of optical spectrum described in Patent Literature 1, the fragmentation of the optical spectrum is eliminated by reallocating optical signals to different frequency slots based on the frequency slot dependency map (defragmentation). However, it is difficult to perform the defragmentation of the optical frequency band with all the optical signals uninterrupted instantaneously. The reason is as follows.

It is necessary to change an optical frequency of an optical signal in an optical transmitter and receiver in order to perform the defragmentation of an optical frequency band. However, it takes a time from several seconds to several tens of seconds in the present circumstances to change the optical frequency, to stabilize the optical frequency, and to enable the optical transmitter and receiver to launch its service.

If the defragmentation of the optical frequency band is performed, therefore, communication services are suspended in the intervening period. Since the interruption in communication services takes away from user's convenience remarkably, it is difficult to perform the defragmentation of the optical frequency band with the interruption of communication services during operations of the communication services. As a result, it is impossible to resolve the fragmentation of the optical frequency band; therefore, it is difficult to improve the usage efficiency of the optical frequency band.

As mentioned above, there has been a problem that, in an optical network based on a dense wavelength division multiplexing system using a flexible frequency grid, it is difficult to improve the usage efficiency of an optical frequency band owing to the occurrence of fragmentation of the optical frequency band.

The object of the present invention is to provide an optical node device, an optical network controller, and an optical network control method to solve the problem mentioned above.

Solution to Problem

An optical network controller according to an exemplary aspect of the present invention includes an optical frequency region setting means for setting a plurality of optical frequency regions in an optical frequency band used in an optical network based on a dense wavelength division multiplexing system using a flexible frequency grid; an optical path setting means for setting optical paths having a common attribute in at least one of the plurality of optical frequency regions; and an optical frequency region control means for changing an optical frequency width of the optical frequency region, and instructing the optical frequency region setting means to reconfigure, as the plurality of optical frequency regions, a plurality of optical frequency reconfigured regions each of which having the optical frequency width after having been changed.

An optical node device according to an exemplary aspect of the present invention includes an optical transmitting and receiving means for transmitting and receiving an optical signal propagating through an optical network based on a dense wavelength division multiplexing system using a flexible frequency grid; and a control means for setting a center frequency and a bandwidth of the optical signal in the optical transmitting and receiving means so as to accommodate the optical signal in a specific optical path, wherein the control means selects the specific optical path from among optical paths having a common attribute that are set in an optical frequency reconfigured region after changing an optical frequency width of an optical frequency region, which is one of a plurality of optical frequency regions included in an optical frequency band used in the optical network.

An optical network system according to an exemplary aspect of the present invention includes an optical node device configured to be used in an optical network based on a dense wavelength division multiplexing system using a flexible frequency grid; and an optical network controller, wherein the optical network controller includes an optical frequency region setting means for setting a plurality of optical frequency regions in an optical frequency band used in the optical network, an optical path setting means for setting optical paths having a common attribute in at least one of the plurality of optical frequency regions, and an optical frequency region control means for changing an optical frequency width of the optical frequency region, and instructing the optical frequency region setting means to reconfigure, as the plurality of optical frequency regions, a plurality of optical frequency reconfigured regions each of which having the optical frequency width after having been changed, and the optical node device includes an optical transmitting and receiving means for transmitting and receiving an optical signal propagating through the optical network; and a control means for setting a center frequency and a bandwidth of the optical signal in the optical transmitting and receiving means so as to accommodate the optical signal in a specific optical path, wherein the control means selects the specific optical path from among optical paths having a common attribute that are set in an optical frequency reconfigured region after changing an optical frequency width of an optical frequency region, which is one of a plurality of optical frequency regions included in an optical frequency band used in the optical network.

An optical network control method according to an exemplary aspect of the present invention includes setting a plurality of optical frequency regions in an optical frequency band used in an optical network based on a dense wavelength division multiplexing system using a flexible frequency grid; setting optical paths having a common attribute in at least one of the plurality of optical frequency regions; and changing an optical frequency width of the optical frequency region based on a setting criterion, and reconfiguring, as the plurality of optical frequency regions, a plurality of optical frequency reconfigured regions each of which having the optical frequency width after having been changed.

Advantageous Effects of Invention

According to the optical node device, the optical network controller, and the optical network control method of the present invention, it is possible to prevent the occurrence of fragmentation of an optical frequency band and improve the usage efficiency of the optical frequency band in an optical network based on a dense wavelength division multiplexing system using a flexible frequency grid.

BRIEF DESCRIPTION OF DRAWINGS

FIG. 7 is a diagram illustrating together the numbers of optical paths that can be set in optical frequency regions in an initial setting state by an optical network controller in accordance with a second exemplary embodiment of the present invention.

FIG. 9 is a diagram illustrating together the numbers of optical paths that the optical network controller in accordance with the second exemplary embodiment of the present invention can set in optical frequency regions by an operation of the optical frequency region control means.

DESCRIPTION OF EMBODIMENTS

Exemplary embodiments of the present invention will be described below with reference to the drawings.

A First Exemplary Embodiment

Figure 1:
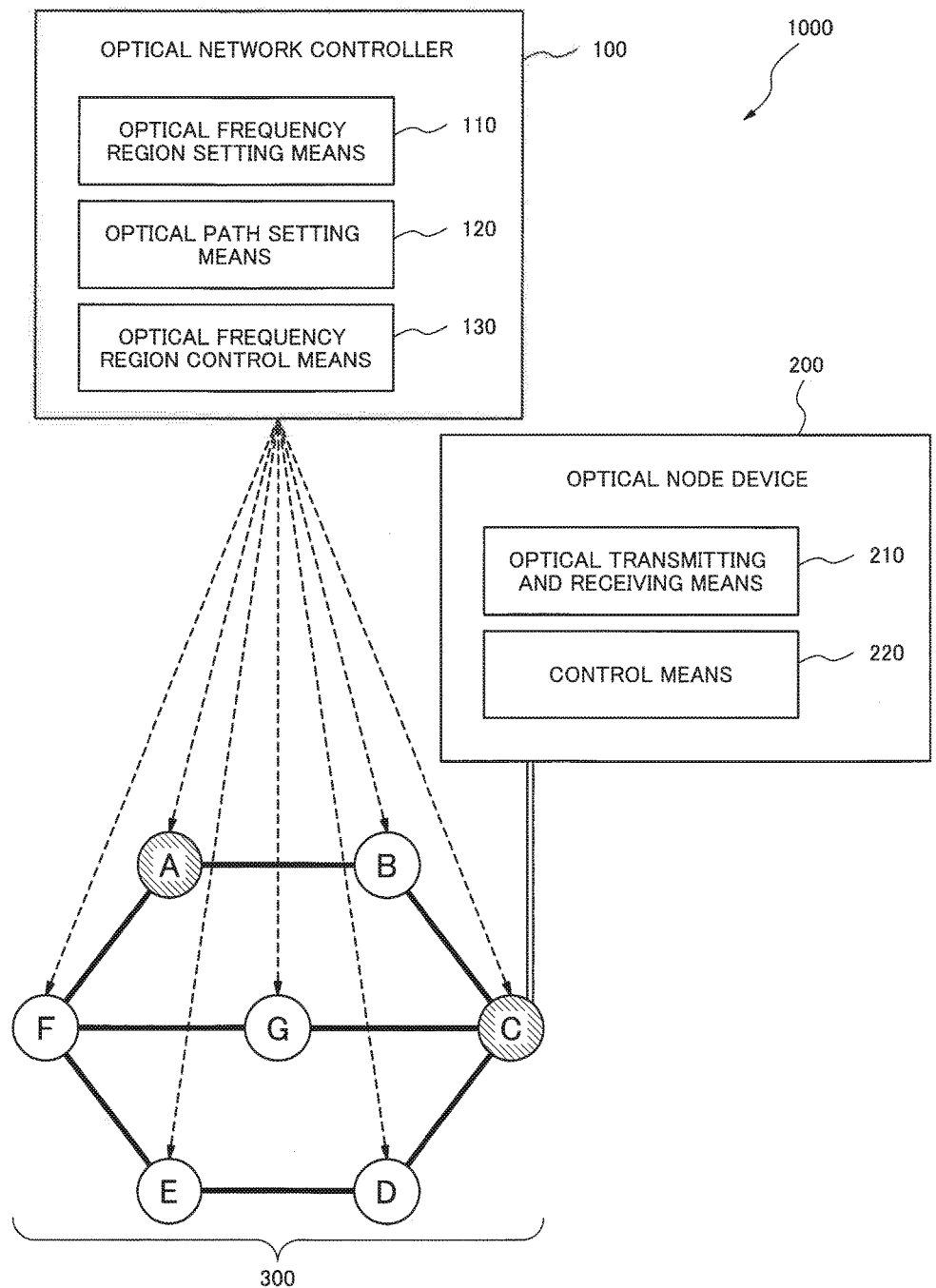
FIG. 1 is a block diagram illustrating a configuration of an optical network system in accordance with a first exemplary embodiment of the present invention.

FIG. 1 is a block diagram illustrating a configuration of an optical network system 1000 in accordance with a first exemplary embodiment of the present invention.

The optical network system 1000 includes an optical network controller 100 and an optical node device 200 that are used for an optical network 300 based on a dense wavelength division multiplexing system using a flexible frequency grid.

The optical network controller 100 includes an optical frequency region setting means 110, an optical path setting means 120, and an optical frequency region control means 130. The optical frequency region setting means 110 sets a plurality of optical frequency regions in an optical frequency band used in the optical network 300. The optical path setting means 120 sets optical paths having a common attribute in at least one of the plurality of optical frequency regions. The optical frequency region control means 130 changes an optical frequency width of the optical frequency region, and instructs the optical frequency region setting means 110 to reconfigure, as a plurality of optical frequency regions, a plurality of optical frequency reconfigured regions each of which has the optical frequency width after having been changed.

The optical node device 200 includes an optical transmitting and receiving means 210 and a control means 220. The optical transmitting and receiving means 210 transmits and receives an optical signal propagating through the optical network 300. The control means 220 sets a center frequency and a bandwidth of an optical signal in the optical transmitting and receiving means 210 so that the optical signal may be accommodated in a specific optical path. Here, the control means 220 selects the specific optical path from among optical paths having a common attribute that are set in the optical frequency reconfigured region after changing the optical frequency width of the optical frequency region, which is one of a plurality of optical frequency regions included in the optical frequency band used in the optical network 300.

As mentioned above, in the optical network system 1000 according to the present exemplary embodiment, the optical network controller 100 sets a plurality of optical frequency regions in the optical frequency band and sets optical paths having a common attribute in at least one of the plurality of optical frequency regions.

If the optical frequency band used in the optical network 300 is divided into optical frequency regions with respect to each attribute of an optical path as described above, there is a possibility that the usage efficiency of the optical frequency band in each optical frequency region becomes non-uniform depending on the pattern of traffic to be generated. For example, although there is no empty area in an optical frequency region A, an empty area may exist in another optical frequency region B. In this case, if trying to allocate further an optical path having the common attribute of the optical frequency region A to the optical frequency region A additionally, it may be impossible to allocate the optical path due to a difference in the attribute despite the fact that there is an empty area in the entirety of the available optical frequency band. As a result, there is the potential for a decrease in the maximum number of allocatable optical paths.

However, the optical network controller 100 in the present exemplary embodiment is configured to include the optical frequency region control means 130; therefore, it is possible to avoid the above-described non-uniformity. Specifically, the optical frequency region control means 130 is configured to change an optical frequency width of the optical frequency region, and instruct the optical frequency region setting means 110 to reconfigure, as a plurality of optical frequency regions, a plurality of optical frequency reconfigured regions each of which has the optical frequency width after having been changed. This makes it possible to avoid the non-uniformity of the optical frequency band usage efficiency in above-mentioned each optical frequency region and increase the maximum number of allocatable optical paths.

In an optical network control method according to the present exemplary embodiment, first, a plurality of optical frequency regions are set in an optical frequency band used in an optical network based on a dense wavelength division multiplexing system using a flexible frequency grid. Then, optical paths having a common attribute are set in at least one of the plurality of optical frequency regions. In this time, it is configured to change an optical frequency width of the optical frequency region based on a setting criterion, and to reconfigure, as a plurality of optical frequency regions, a plurality of optical frequency reconfigured regions each of which has the optical frequency width after having been changed.

The above-mentioned configuration makes it possible to prevent the occurrence of fragmentation of an optical frequency band and improve the usage efficiency of the optical frequency band in an optical network.

Next, the operation of the optical network controller 100 according to the present exemplary embodiment will be described in further detail.

A case will be described below as an example in which the optical path setting means 120 sets optical paths using the number of frequency slots composing an optical path as an attribute. Specifically, as to types of optical paths, an optical path with one slot in width, an optical path with two slots in width, and an optical path with four slots in width are set.

In the optical network 300 illustrated in FIG. 1, "A" to "F" represent nodes respectively. The optical node device 200 is disposed in each node, and optical fibers connect respective nodes to each other. Here, the optical network controller 100 is configured to notify each optical node device 200 of optical path setting information.

Figure 2:
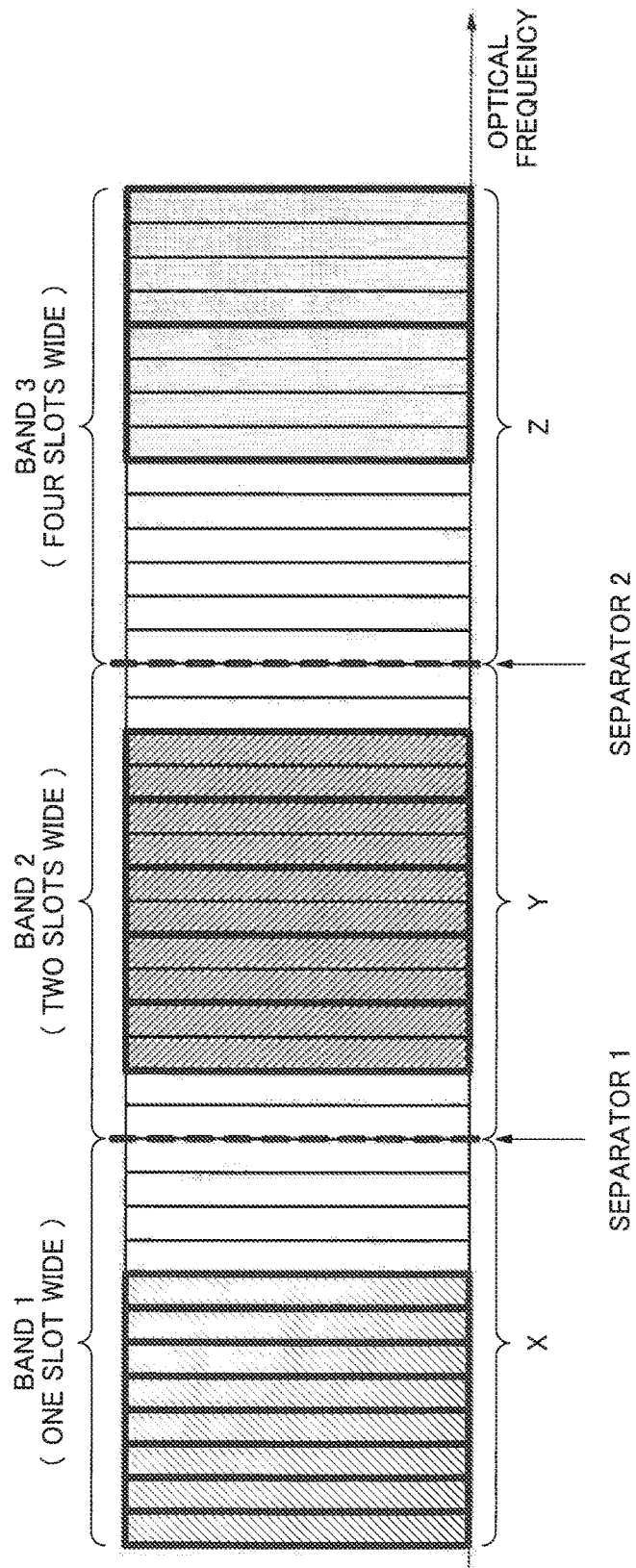
FIG. 2 is a diagram schematically illustrating optical paths initially set in optical frequency regions by the optical network controller in accordance with the first exemplary embodiment of the present invention.

An optical fiber from the node A to the node C in the optical network 300 will be described as an example. It is assumed that the entirety of the optical frequency region that can be transmitted through the optical fiber complies with a flexible frequency grid standardized by ITU-T recommendation G.694.1, and that the slot width of the flexible frequency grid is forty slots wide in total. FIG. 2 illustrates the entirety of the optical frequency region that can be transmitted through the optical fiber from the node A to the node C. The horizontal axis represents an optical frequency, and each rectangular block represents a frequency slot.

The optical frequency region setting means 110 included in the optical network controller 100 divides the optical frequency band and sets three optical frequency regions, that is, a band 1 (the number of slots: X), a band 2 (the number of slots: Y), and a band 3 (the number of slots: Z), for example. A separator 1 and a separator 2 in FIG. 2 indicate an optical frequency forming the division between the bands. In the example illustrated in FIG. 2, the band 1 is an optical frequency region including twelve slots (=X), the band 2 is one including fourteen slots (=Y), and the band 3 is one including fourteen slots (=Z). The entirety of the optical frequency region includes forty slots (=X+Y+Z), as mentioned above.

The optical path setting means 120 sets optical paths having a common attribute in each of the optical frequency regions (bands), respectively. Accordingly, for example, if it is configured for the band 1 to accommodate only an optical path one slot wide, the band 1 cannot accommodate an optical path two slots wide and an optical path four slots wide that differ in the attribute even though there is an empty area.

As illustrated in FIG. 2, n (=8) pieces of optical path x (=1) slot wide are set in the band 1, m (=5) pieces of optical path y (=2) slot wide are set in the band 2, and l (=2) pieces of optical path z (=4) slot wide are set, as initial setting.

Figure 3:
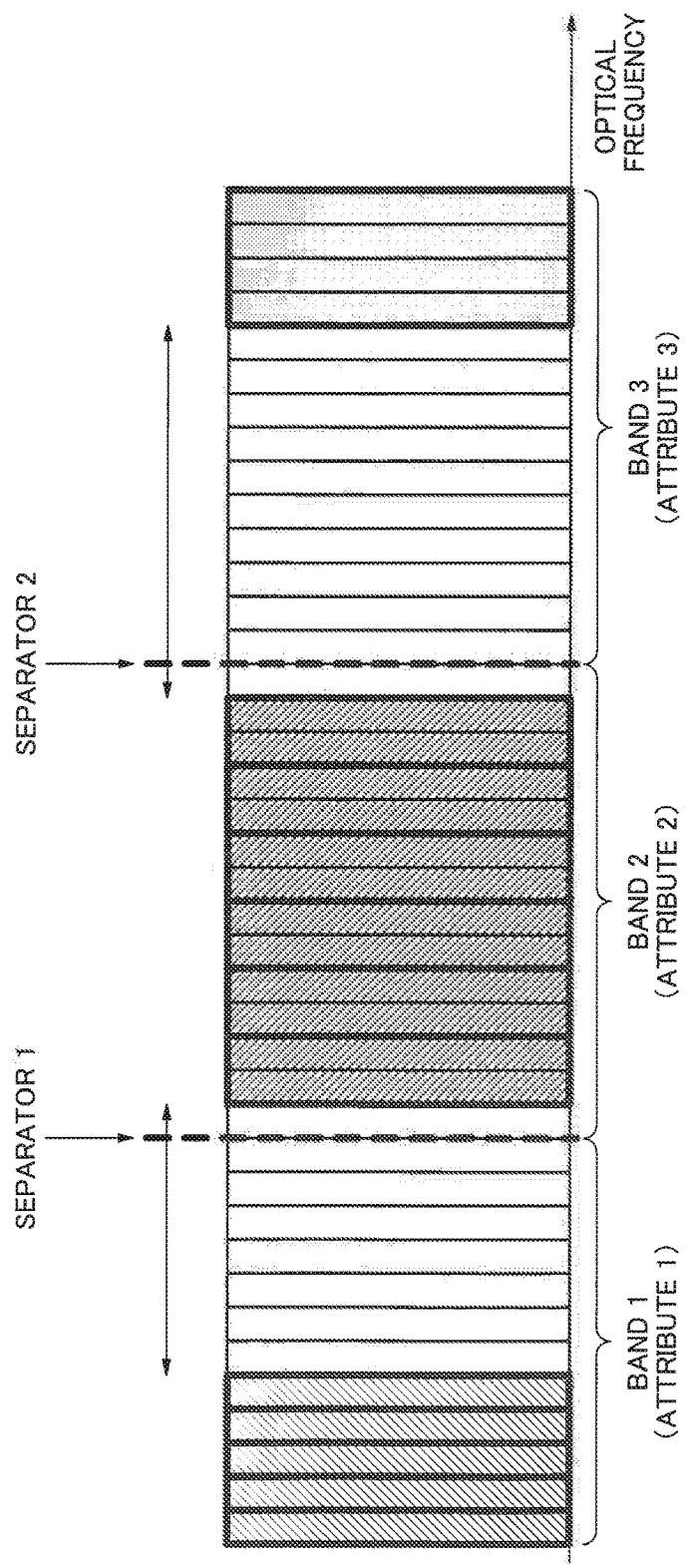
FIG. 3 is a schematic diagram for describing an operation of an optical path setting means included in an optical network controller in accordance with the first exemplary embodiment of the present invention.

In this case, the optical path setting means 120 can be configured to set an optical path in an optical frequency starting from the optical frequency most distant from a separator indicating an optical frequency forming the division between a plurality of optical frequency regions (bands). FIG. 3 schematically illustrates an operation in this case. In the example illustrated in FIG. 3, optical paths are set from the edge side of the band in the band 1 and the band 3 that are located at both ends of the optical frequency band. In the band 2 that is located at the midpoint region of the optical frequency band, optical paths can be set starting from the central area. The configuration to set optical paths as described above makes it possible to increase the degree of freedom in moving the separator, that is, the degree of freedom in changing the optical frequency width of the optical frequency region (band).

Figure 4:
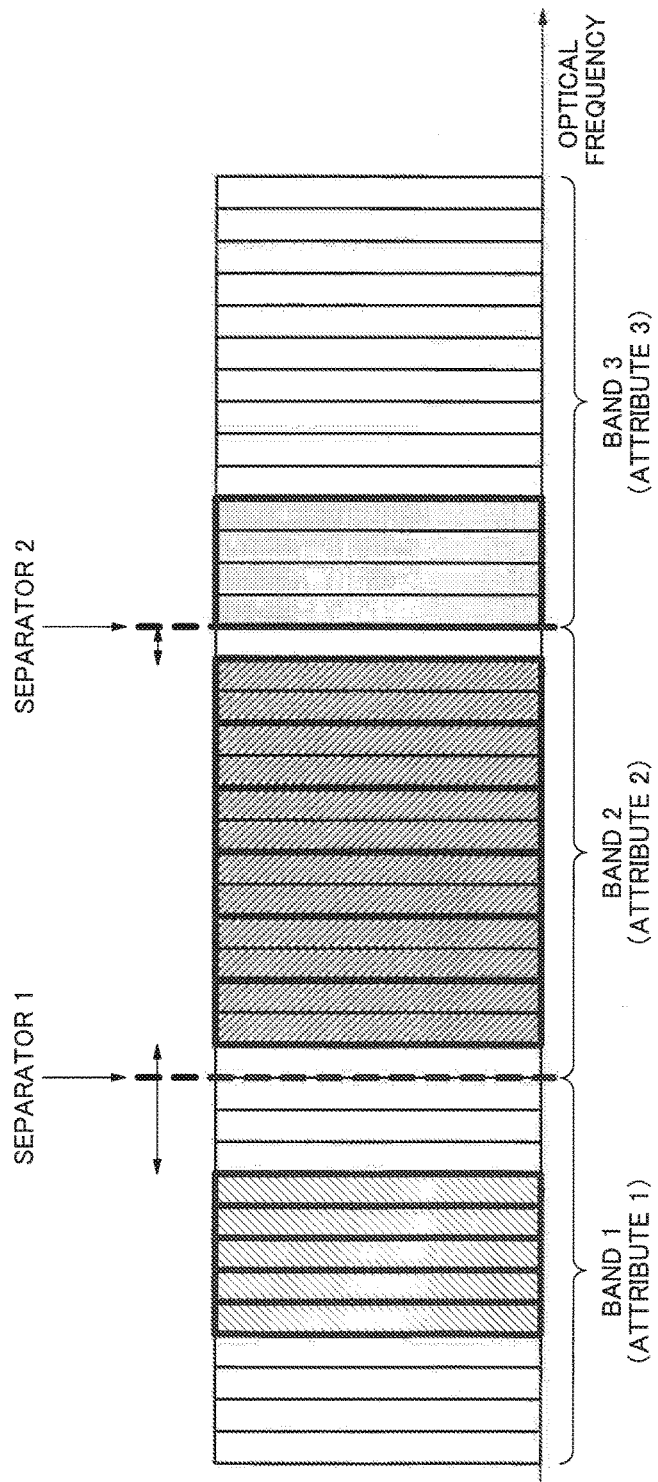
FIG. 4 is a schematic diagram for describing optical path setting in a comparative example with respect to the first exemplary embodiment of the present invention.

FIG. 4 illustrates a comparative example in which optical paths are randomly allocated. In this case, the degree of freedom in moving a separator decreases even though the number of empty slots is identical. Compared with the comparative example illustrated in FIG. 4, it turns out that the number of the slots through which the separator 1 can move in the direction of the band 1 from the band 2 increases from three to seven according to the setting of the optical path by using the optical path setting means 120 in the exemplary embodiment illustrated in FIG. 3. The number of the slots through which the separator 2 can move in the direction of the band 3 from the band 2 increases from zero to ten.

Next, the operation of the optical frequency region control means 130 included in the optical network controller 100 according to the present exemplary embodiment will be described in further detail.

The optical frequency region control means 130 can be configured to change the optical frequency width of the optical frequency region so that the optical frequency band utilization ratios in the plurality of optical frequency regions (bands) may be equalized. In this case, the control means 220 included in the optical node device 200 selects a specific optical path from among optical paths having a common attribute that are set in the optical frequency reconfigured region, and the optical frequency band utilization ratios in a plurality of the optical frequency reconfigured regions are equal to each other.

Figure 5:
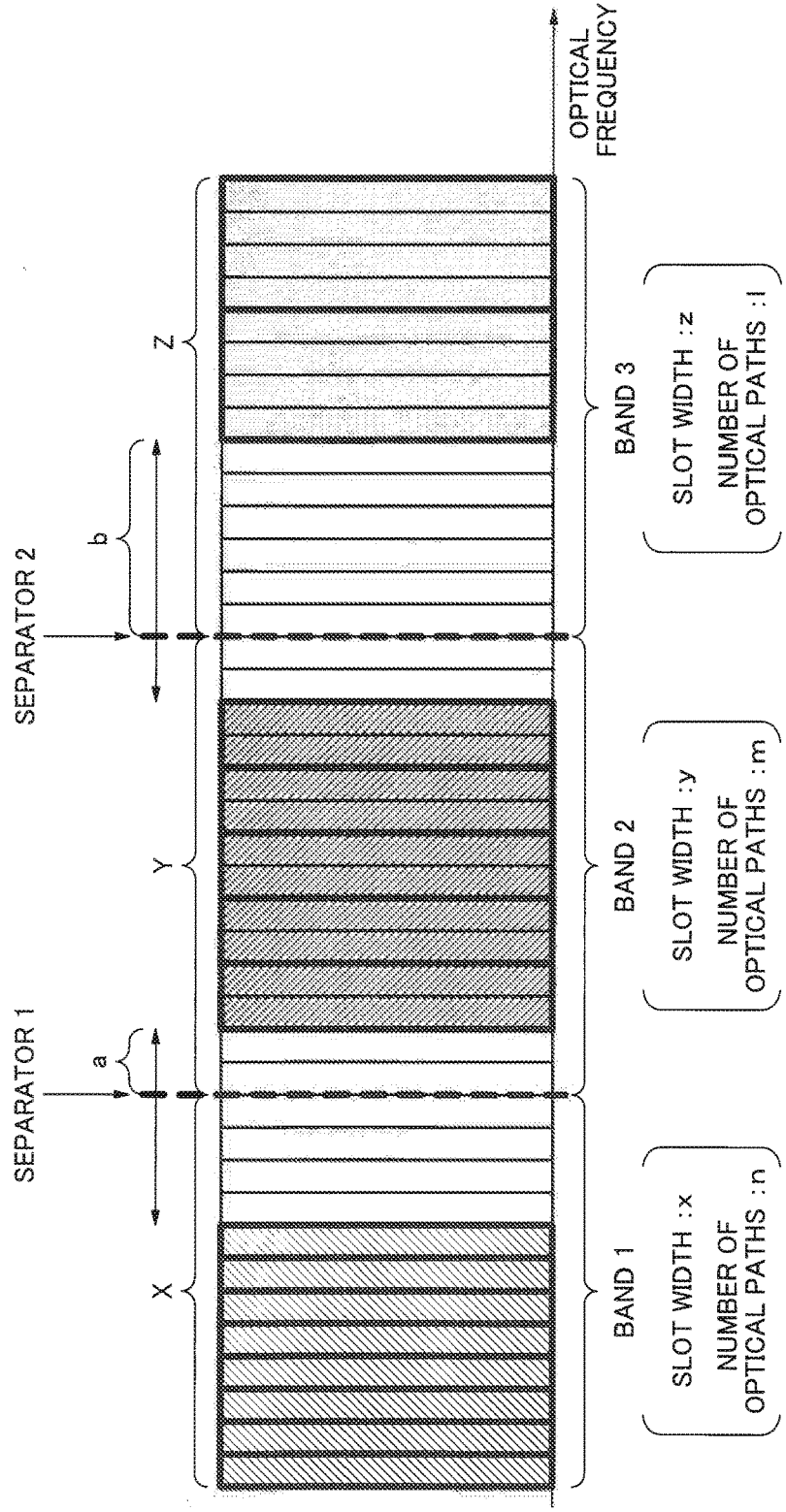
FIG. 5 is a schematic diagram for describing an operation of an optical frequency region control means included in the optical network controller in accordance with the first exemplary embodiment of the present invention.

Specifically, as illustrated in FIG. 5, for example, it is assumed that the position (optical frequency) of the separator 1 moves to the right side by "a" pieces of the slot, and that the position (optical frequency) of the separator 2 moves to the right side by "b" pieces of the slot. In this case, the sum of the number of the slots allocated to the band 1 varies from X (=12) to X+a (=12+a) before and after the movement of the separators. Similarly, the sum of the number of the slots allocated to the band 2 varies from Y (=14) to Y−a+b (=14−a+b), and the sum of the number of the slots allocated to the band 3 varies from Z (=14) to Z−b (=14−b), respectively.

Here, the optical frequency band utilization ratio in each bands is equal to a value obtained by dividing the sum of the number of the slots to which optical paths have been allocated by the sum of the number of the slots allocated to each band. Accordingly, the optical frequency band utilization ratio becomes x×n/(X+a) in the band 1, y×m/(Y−a+b) in the band 2, and z×l/(Z−b) in the band 3. As a result, the condition that the optical frequency band utilization ratios in a plurality of optical frequency regions (bands) becomes equal to each other, can be expressed by following formula (1).

$$\frac{x \times n}{(X+a)} = \frac{y \times m}{(Y-a+b)} = \frac{z \times l}{(Z-b)} \quad (1)$$

In formula (1), each of "a" and "b" represents an integer. Since formula (1) is a simultaneous linear equations with two unknowns of "a" and "b", the solutions can be obtained with the exception of the case that the determinant of the coefficient matrix is equal to zero; therefore, the travel distance of the separator can be determined from the values of "a" and "b".

Although it is assumed in the above description that the optical frequency band utilization ratios in the plurality of optical frequency regions (bands) are equal to each other, the present invention is not limited to this. For example, it may be set so that the optical frequency band utilization ratio of the band may become larger as the band accommodates an optical path having a larger slot width (x, y, z), that is, an optical path having a wider bandwidth. The condition including the above-mentioned case can be expressed by following formula (2) if x<y<z.

$$\frac{x \times n}{(X+a)} \leq \frac{y \times m}{(Y-a+b)} \leq \frac{z \times l}{(Z-b)} \quad (2)$$

If the numbers of the slots (X=12, Y=14, Z=14), the slot widths (x=1, y=2, z=4), and the numbers of the optical paths (n=8, m=5, l=2), are set as mentioned above, it turns out that above-described formula (2) holds when a=2 and b=4, for example. By moving the separator automatically based on the solutions of "a" and "b" found by above-described formula (1) and formula (2), it is possible to automatically eliminate the non-uniformity of the optical frequency band usage efficiency between the bands, and to improve the usage efficiency of the optical frequency band in the optical network as a whole.

Figure 6:
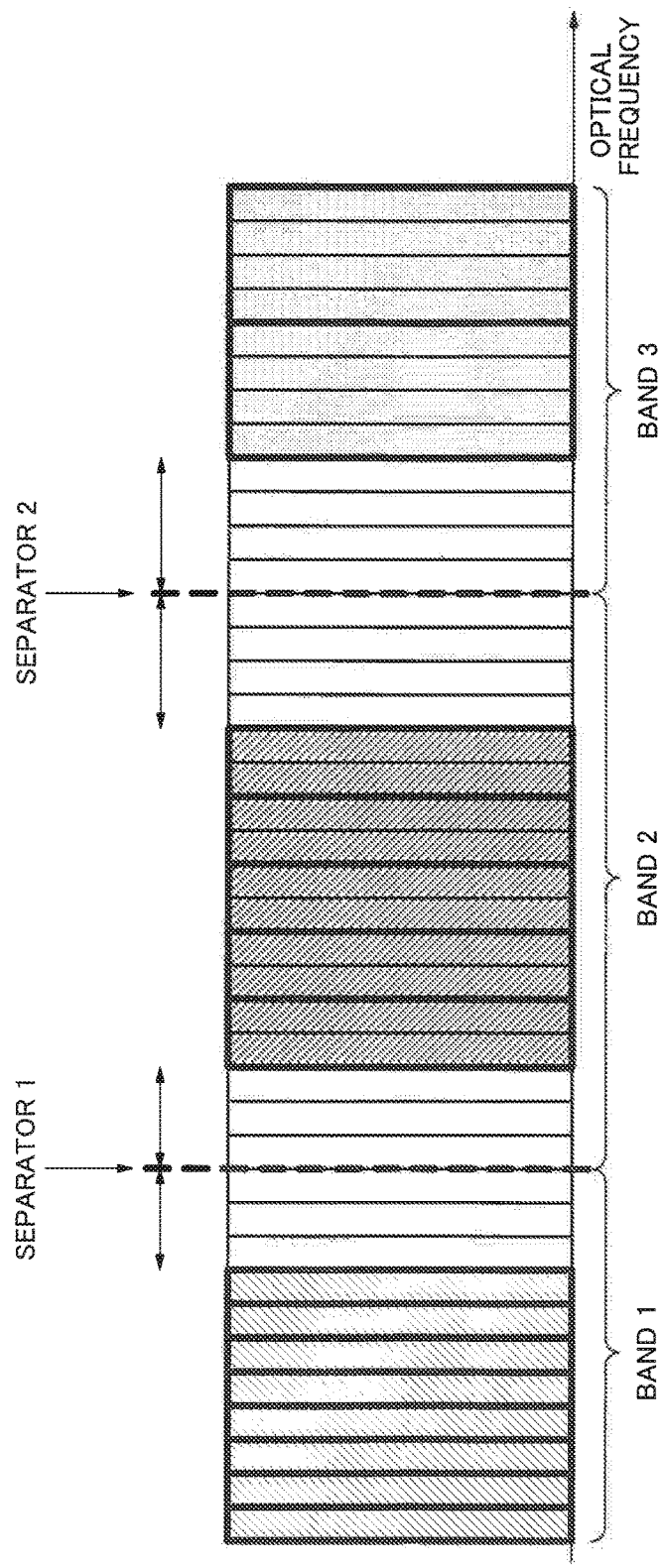
FIG. 6 is a schematic diagram for describing another operation of the optical frequency region control means included in the optical network controller in accordance with the first exemplary embodiment of the present invention.

In the above-mentioned description, it is used as the setting criterion in changing the optical frequency width of the optical frequency region that the optical frequency band utilization ratios in respective bands become equal to each other; however, the present invention is not limited to this. As illustrated in FIG. 6, the optical frequency width may be changed so that a separator may be located at the midpoint of an empty band between the bands lying next to each other. That is to say, it can be made a setting criterion in changing the optical frequency width of the optical frequency region (band) that the optical frequency in the middle of an unset region, where an optical path included in a plurality of optical frequency regions has not been set, becomes equal to the optical frequency at the border between the plurality of optical frequency regions. In this case, the optical frequency region control means 130 changes an optical frequency width of the optical frequency region so that the optical frequency in the middle of an unset region, where an optical path included in a plurality of optical frequency regions has not been set, may become equal to the optical frequency at the border between the plurality of optical frequency regions.

The transfer unit of the separator is not limited specifically. The separator may move by the one slot, or it may move collectively by more than one slots. For example, when the separator moves by two slots, the separator may move by one slot repeating it two times, or it may move by two slots collectively. Similarly, when the separator moves by four slots, the separator may move by one slot repeating it four times, or it may move by four slots collectively.

A trigger (timing) to move the separator is not specifically limited. For example, it is possible to use adding or removing an optical path as a trigger. That is to say, the optical frequency region control means 130 can be configured to change the optical frequency width of the optical frequency region using as a trigger at least one of a request to add an optical path and a request to remove an optical path. The present exemplary embodiment is not limited to this. The separator may also be moved by on-demand system using as a trigger the instructions from a user of the optical network 300. The separator may also be moved periodically at predetermined intervals during a period of not adding or removing an optical path.

If there are more than one separators, all the separators may be moved at the same time, or each of them may be moved in turn. The moving direction of the separator (right hand or left hand in FIG. 5, for example) is not specifically limited. For example, all the separators may be moved in one direction, or each of them may be moved in a different direction.

A Second Exemplary Embodiment

Next, a second exemplary embodiment of the present invention will be described. An optical network controller according to the present exemplary embodiment includes an optical frequency region setting means 110, an optical path setting means 120, and an optical frequency region control means 130. The optical frequency region setting means 110 sets a plurality of optical frequency regions in an optical frequency band used in the optical network 300. The optical path setting means 120 sets optical paths having a common attribute in at least one of the plurality of optical frequency regions. The optical frequency region control means 130 changes an optical frequency width of the optical frequency region, and instructs the optical frequency region setting means 110 to reconfigure, as a plurality of optical frequency regions, a plurality of optical frequency reconfigured regions each of which has the optical frequency width after having been changed.

The optical network controller according to the present exemplary embodiment differs in the configuration of the optical frequency region control means 130 from the optical network controller 100 according to the first exemplary embodiment. The optical frequency region control means 130 in the present exemplary embodiment is configured to change an optical frequency width of the optical frequency region based on an attribute of an optical path. The operation of the optical frequency region control means 130 will be described below in detail.

The optical paths that the optical path setting means 120 disposes as initial setting are the same as those in the first exemplary embodiment illustrated in FIG. 2. In this case, the maximum number of addable optical paths is four in the band 1 for optical path one slot wide, two in the band 2 for optical path two slots wide, and one in the band 3 for optical path four slots wide. These results are illustrated together in FIG. 7.

The attribute of the optical path will be described using a bandwidth of the optical path as an example. If the proportion of the optical path having a narrow slot width is large, the region for the band 1 to accommodate an optical path one slot wide, and the region for the band 2 to accommodate an optical path two slots wide are expanded; and the region for the band 3 to accommodate an optical path with a wider slot width is narrowed. The above-described configuration makes it possible to improve the optical frequency usage efficiency of the optical network as a whole.

Figure 8:
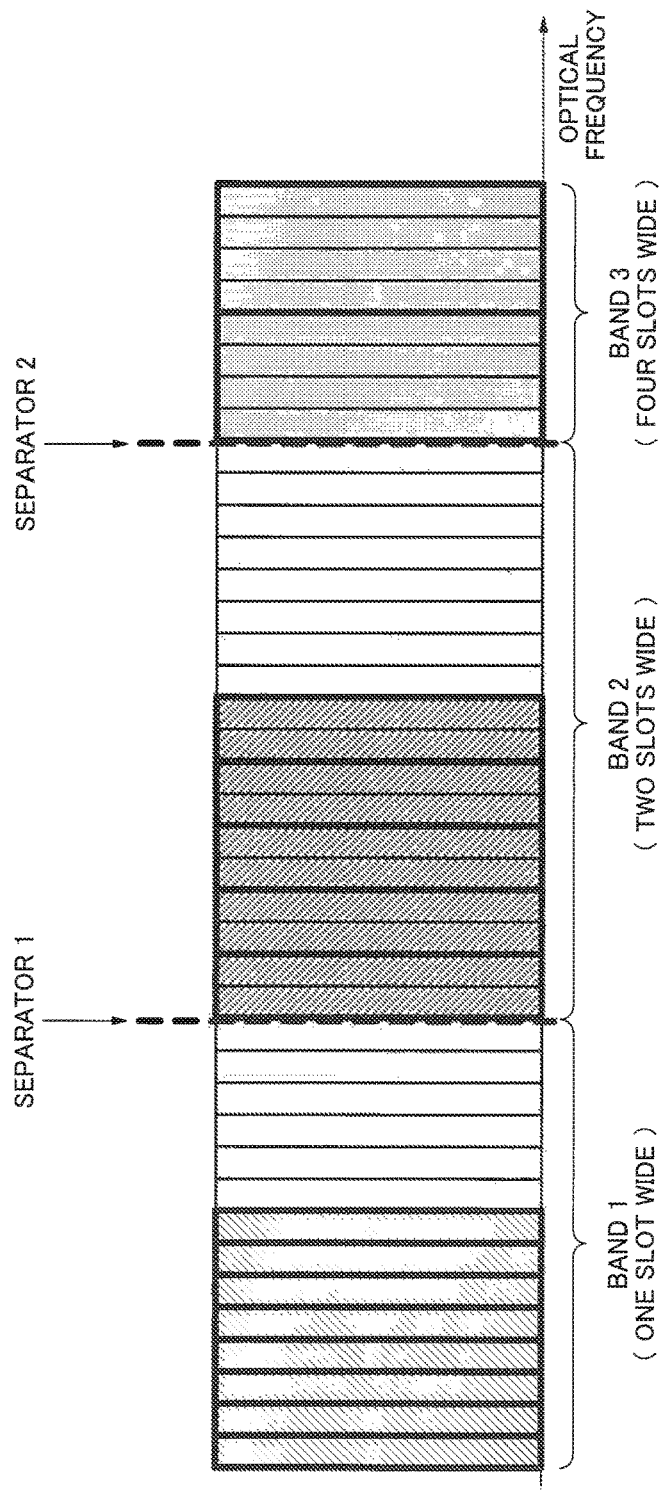
FIG. 8 is a schematic diagram for describing an operation of an optical frequency region control means included in the optical network controller in accordance with the second exemplary embodiment of the present invention.

Specifically, as illustrated in FIG. 8, the present exemplary embodiment can be configured to move the separator 1 and the separator 2 to the band 3 side. FIG. 9 illustrates the maximum number of addable allocation of the optical paths in each band after the separators have been moved. With those results compared with the results of the case with the initial setting illustrated in FIG. 7, it turns out that the number of the accommodated optical paths increases each of which has a small slot width (slot width 1, 2), which are likely to be added or removed if the proportion of the optical path having a narrow slot width is large. In contrast, it turns out that the number of the accommodated optical paths decreases each of which has a large slot width (slot width 4), which are less likely to be added or removed.

Even though the characteristics of the slot width of the optical path to be added or removed suddenly change from the state of the initial setting, it becomes possible to eliminate the non-uniformity of the optical frequency usage efficiency between the bands by moving the separators forcibly. As a result, it is possible to improve the optical frequency usage efficiency of the optical network as a whole.

The trigger (timing) to move the separator is not specifically limited. For example, it is possible to use the addition or removal of an optical path as a trigger. That is to say, the optical frequency region control means 130 can be configured to change the optical frequency width of the optical frequency region using as a trigger at least one of a request to add an optical path and a request to remove an optical path. The present exemplary embodiment is not limited to this. The separator may also be moved by on-demand system using as a trigger the instructions from a user of the optical network 300. The separator may also be moved periodically at predetermined intervals during a period of not adding or removing an optical path.

If there are more than one separators, all the separators may be moved at the same time, or each of them may be moved in turn. The moving direction of the separator is not specifically limited. For example, all the separators may be moved in one direction, or each of them may be moved in a different direction.

The present invention has been described by taking the exemplary embodiments described above as model examples. However, the present invention is not limited to the aforementioned exemplary embodiments. The present invention can be implemented in various modes that are apparent to those skilled in the art within the scope of the present invention.

This application is based upon and claims the benefit of priority from Japanese Patent Application No. 2014-089696, filed on Apr. 24, 2014, the disclosure of which is incorporated herein in its entirety by reference.

REFERENCE SIGNS LIST

100 Optical network controller
110 Optical frequency region setting means
120 Optical path setting means
130 Optical frequency region control means
200 Optical node device
210 Optical transmitting and receiving means
220 Control means
300 Optical network
1000 Optical network system

The invention claimed is:

1. An optical network apparatus, comprising:
a controller configured to execute:
an optical frequency region setting unit configured to set a plurality of optical frequency regions in an optical frequency band used in an optical network based on a dense wavelength division multiplexing system using a flexible frequency grid;
an optical path setting unit configured to set optical paths having a common attribute in at least one of the plurality of optical frequency regions; and
an optical frequency region control unit configured to change an optical frequency width of the optical frequency region, and instruct the optical frequency region setting unit to reconfigure, as the plurality of optical frequency regions, a plurality of optical frequency reconfigured regions each of which having the optical frequency width after having been changed,
wherein the optical path setting unit sets the optical paths in an optical frequency starting from one most distant from a division between the plurality of optical frequency regions.

2. The optical network controller according to claim 1, wherein the optical frequency region control unit changes the optical frequency width of the optical frequency region so that optical frequency band utilization ratios in the plurality of optical frequency regions may be equalized.

3. The optical network controller according to claim 1, wherein the optical frequency region control unit changes the optical frequency width of the optical frequency region based on an attribute of the optical path.

4. The optical network controller according to claim 1, wherein the optical frequency region control unit changes the optical frequency width of the optical frequency region using as a trigger at least one of a request to add an optical path and a request to remove an optical path.

5. An optical network system, comprising:
the optical network apparatus according to claim 1; and
an optical node device configured to be used in an optical network based on a dense wavelength division multiplexing system using a flexible frequency grid, wherein the optical node device includes
an optical transmitter and receiver configured to transmit and receive an optical signal propagating through the optical network; and
a controller configured to set a center frequency and a bandwidth of the optical signal in the optical transmitting and receiving unit so as to accommodate the optical signal in a specific optical path,
wherein the controller selects the specific optical path from among optical paths having a common attribute that are set in an optical frequency reconfigured region after changing an optical frequency width of an optical frequency region, which is one of a plurality of optical frequency regions included in an optical frequency band used in the optical network.

6. The optical network controller according to claim 1, wherein the optical frequency region control unit changes the optical frequency width of the optical frequency region so that optical frequency band utilization ratios in the plurality of optical frequency regions may be equalized.

7. The optical network controller according to claim 1, wherein the optical frequency region control unit changes the optical frequency width of the optical frequency region so that an optical frequency in a middle of an unset region, where an optical path included in the plurality of optical frequency regions has not been set, may become equal to an optical frequency at a border between the plurality of optical frequency regions.

8. The optical network controller according to claim 1, wherein the optical frequency region control unit changes the optical frequency width of the optical frequency region based on an attribute of the optical path.

9. An optical network apparatus, comprising:
a controller configured to execute:
an optical frequency region setting unit configured to set a plurality of optical frequency regions in an optical frequency band used in an optical network based on a dense wavelength division multiplexing system using a flexible frequency grid;
an optical path setting unit configured to set optical paths having a common attribute in at least one of the plurality of optical frequency regions; and
an optical frequency region control unit configured to change an optical frequency width of the optical frequency region, and instruct the optical frequency region setting unit to reconfigure, as the plurality of optical frequency regions, a plurality of optical frequency reconfigured regions each of which having the optical frequency width after having been changed,
wherein the optical frequency region control unit changes the optical frequency width of the optical frequency region so that an optical frequency in a middle of an unset region, where an optical path included in the plurality of optical frequency regions has not been set, may become equal to an optical frequency at a border between the plurality of optical frequency regions.

10. An optical node device, comprising:
an optical transmitter and a receiver configured to transmit and receive an optical signal propagating through an optical network based on a dense wavelength division multiplexing system using a flexible frequency grid; and
a controller configured to set a center frequency and a bandwidth of the optical signal in the optical transmitting and receiving unit so as to accommodate the optical signal in a specific optical path,
wherein the controller is further configured to select the specific optical path from among optical paths having a common attribute that are set in an optical frequency reconfigured region after changing an optical frequency width of an optical frequency region, which is one of a plurality of optical frequency regions included in an optical frequency band used in the optical network, and
wherein the optical paths are set in an optical frequency starting from one most distant from a division of the optical frequency reconfigured region.

11. The optical node device according to claim 10, wherein optical frequency band utilization ratios are equalized in a plurality of the optical frequency reconfigured regions after changing an optical frequency width of each of the plurality of optical frequency regions.

12. An optical node device, comprising:
an optical transmitter and a receiver configured to transmit and receive an optical signal propagating through an optical network based on a dense wavelength division multiplexing system using a flexible frequency grid; and
a controller configured to set a center frequency and a bandwidth of the optical signal in the optical transmitting and receiving unit so as to accommodate the optical signal in a specific optical path,
wherein the controller is further configured to select the specific optical path from among optical paths having a common attribute that are set in an optical frequency reconfigured region after changing an optical frequency width of an optical frequency region, which is one of a plurality of optical frequency regions included in an optical frequency band used in the optical network, and
wherein an optical frequency in a middle of an unset region where the optical path included in the plurality of optical frequency regions has not been set, is equal to an optical frequency at a border between a plurality of the optical frequency reconfigured regions after changing an optical frequency width of each of the plurality of optical frequency regions.

13. An optical network control method, comprising:
setting a plurality of optical frequency regions in an optical frequency band used in an optical network based on a dense wavelength division multiplexing system using a flexible frequency grid;
setting optical paths having a common attribute in at least one of the plurality of optical frequency regions; and
changing an optical frequency width of the optical frequency region based on a setting criterion, and reconfiguring, as the plurality of optical frequency regions, a plurality of optical frequency reconfigured regions each of which having the optical frequency width after having been changed,
wherein the setting of the optical paths includes setting the optical paths in an optical frequency starting from one most distant from a division between the plurality of optical frequency regions.

14. The optical network control method according to claim 13,
wherein the changing of the optical frequency width of the optical frequency region includes making it the setting criterion that optical frequency band utilization ratios in the plurality of optical frequency regions become equal to each other.

15. The optical network control method according to claim 13,
wherein the changing of the optical frequency width of the optical frequency region includes making an attribute of the optical path the setting criterion.

16. The optical network control method according to claim 13,
wherein the changing of the optical frequency width of the optical frequency region includes using as a trigger at least one of a request to add an optical path and a request to remove an optical path.

17. An optical network control method, comprising:
setting a plurality of optical frequency regions in an optical frequency band used in an optical network based on a dense wavelength division multiplexing system using a flexible frequency grid;
setting optical paths having a common attribute in at least one of the plurality of optical frequency regions; and
changing an optical frequency width of the optical frequency region based on a setting criterion, and reconfiguring, as the plurality of optical frequency regions, a plurality of optical frequency reconfigured regions each of which having the optical frequency width after having been changed,
wherein the changing of the optical frequency width of the optical frequency region includes making it the setting criterion that an optical frequency in a middle of an unset region where the optical path included in the plurality of optical frequency regions has not been set becomes equal to an optical frequency at a border between the plurality of optical frequency regions.

* * * * *